United States Patent
Hayashi et al.

[11] Patent Number: 6,144,497
[45] Date of Patent: Nov. 7, 2000

[54] PROJECTION OPTICAL SYSTEM

[75] Inventors: Kohtaro Hayashi, Toyonaka; Kenji Konno, Sakai, both of Japan

[73] Assignee: Minolta Co., Ltd., Osaka, Japan

[21] Appl. No.: 09/274,947

[22] Filed: Mar. 23, 1999

[30] Foreign Application Priority Data

Mar. 26, 1998 [JP] Japan .................................. 10-079022

[51] Int. Cl.[7] ............................ G02B 27/14; G02B 27/10
[52] U.S. Cl. ............................ 359/634; 359/618; 359/629
[58] Field of Search ................................... 359/634, 629, 359/618; 353/30

[56] References Cited

U.S. PATENT DOCUMENTS 5,562,334  10/1996  Wortel ...................................... 359/69

FOREIGN PATENT DOCUMENTS 5-27343   2/1993  Japan .
8-334727  12/1996  Japan .

*Primary Examiner*—Georgia Epps
*Assistant Examiner*—Michael A Lucas
*Attorney, Agent, or Firm*—Sidley & Austin

[57] ABSTRACT

Dichroic mirrors are disposed at the same inclination angle in a position such that a plane including an incidence optical path and a reflection optical path (transmission optical path of green light) of blue light reflected at a reflecting surface of one dichroic mirror is orthogonal to a plane including an incidence optical path and a reflection optical path of red light reflected at the other dichroic mirror. The other dichroic mirror is formed by cementing two glass substrates, and a red light reflecting layer is formed on the joint surface.

12 Claims, 13 Drawing Sheets

PROJECTION OPTICAL SYSTEM

This application is based on application No. H10-079022 filed in Japan, the contents of which are hereby incorporated by reference.

BACKGROUND OF THE INVENTION

1. Field of the Invention

The present invention relates to a projection optical system used in a color projector that applies illumination light to a transmissive liquid crystal panel or the like to project an image so as to be enlarged, and more particularly, to a projection optical system that reduces astigmatic difference caused when image information of R, image information of G and image information of B are combined.

2. Description of the Prior Art

A conventional projection optical system has an arrangement as shown in FIG. 1. Light beams of wavelength ranges of red, green and blue (hereinafter, referred to as "red light", "green light" and "blue light", respectively) separated by an illumination system (not shown) are applied to display panels 10R, 10G and 10B such as transmissive liquid crystal panels for displaying images of the colors. The display panels 10R, 10G and 10B transmit or reflect the applied light so that image information of the colors exits therefrom.

The green light exiting from the display panel 10G is transmitted by dichroic mirrors 4 and 5. The red light exiting from the display panel 10R is reflected at the dichroic mirror 4 and is transmitted by the dichroic mirror 5. The blue light exiting from the display panel 10B is reflected at the dichroic mirror 5. The red light, the green light and the blue light being combined are projected by a projection lens system 7 so as to be enlarged.

Since the dichroic mirrors 4 and 5 are inclined with respect to the light transmitted thereby, astigmatic difference is caused. The astigmatic difference increases as the inclination angle and the transmission thickness of a glass substrate or the like increases.

Means for correcting the astigmatic difference include the provision of a separate correction lens of a cylindrical configuration or the like that refracts only light of one of two orthogonal directions. However, in the case of FIG. 1, there is no astigmatic difference in the blue light, there is astigmatic difference due to the dichroic mirror 5 in the red light and there is astigmatic difference due to the dichroic mirrors 4 and 5 in the green light, so that the magnitude of the astigmatic difference is nonuniform. Therefore, it is difficult to correct the astigmatic difference by the correction lens.

A method of reducing the astigmatic difference is disclosed, for example, in Japanese Laid-open Patent Application No. H8-334727. According to this method, as shown in FIG. 2, the angles of inclination of the two dichroic mirrors 4 and 5 to the optical paths of the light transmitted by the dichroic mirrors 4 and 5 are reduced to thereby reduce the astigmatic difference.

Moreover, a method has been proposed in which, as shown in FIG. 3, the dichroic mirrors 4 and 5 having the same thickness are disposed at the same inclination angle in a so-called twisted position such that a plane including the incidence optical path R1 and the reflection optical path G1 of the red light reflected at the dichroic mirror 4 is orthogonal to a plane including the incidence optical path B1 and the reflection optical path G1 of the blue light reflected at the dichroic mirror 5 to thereby cancel out the astigmatic difference in the green light transmitted by the dichroic mirrors 4 and 5 and the image is projected onto a screen 30.

However, according to the method disclosed in Japanese Laid-open Patent Application No. H8-334727, since it is necessary to dispose the display panels 10B and 10R so as not to interfere with a luminous flux C for projection and the projection lens system 7 and that the optical path lengths of the luminous fluxes exiting from the three display panels 10B, 10R and 10G are the same, the lens back focal length LB of the projection system increases, so that the projection optical system increases in size.

According to the method shown in FIG. 3, although no astigmatic difference is caused in the blue light which is reflected at the surface of the dichroic mirror 5 and the astigmatic difference caused in the green light is canceled out by the green light being transmitted by the dichroic mirrors 4 and 5, astigmatic difference remains in the red light which is transmitted by the dichroic mirror 5. Further, when downsized display panels which have frequently been used in recent years are used, since an optical system close to a telecentric optical system is used in order to curb image deteriorations other than the astigmatic difference, the lens system increases in size, so that the cost increases.

SUMMARY OF THE INVENTION

An object of the present invention is to provide an improved projection optical apparatus.

Another object of the present invention is to provide a projection optical apparatus having a projection optical system in which space for the projection system is reduced and image deterioration including the astigmatic difference are substantially not caused.

To achieve the above-mentioned object, a projection optical apparatus comprises a projection lens system, wherein some of the lens elements included in the lens system are disposed so as to be decentered with respect to an optical axis of the entire projection lens system and a dichroic mirror of which reflecting surface is disposed so as to incline with respect to the optical axis of the projection lens system, the dichroic mirror comprising two transparent substrates and the reflecting surface formed between the two transparent substrates.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 4:
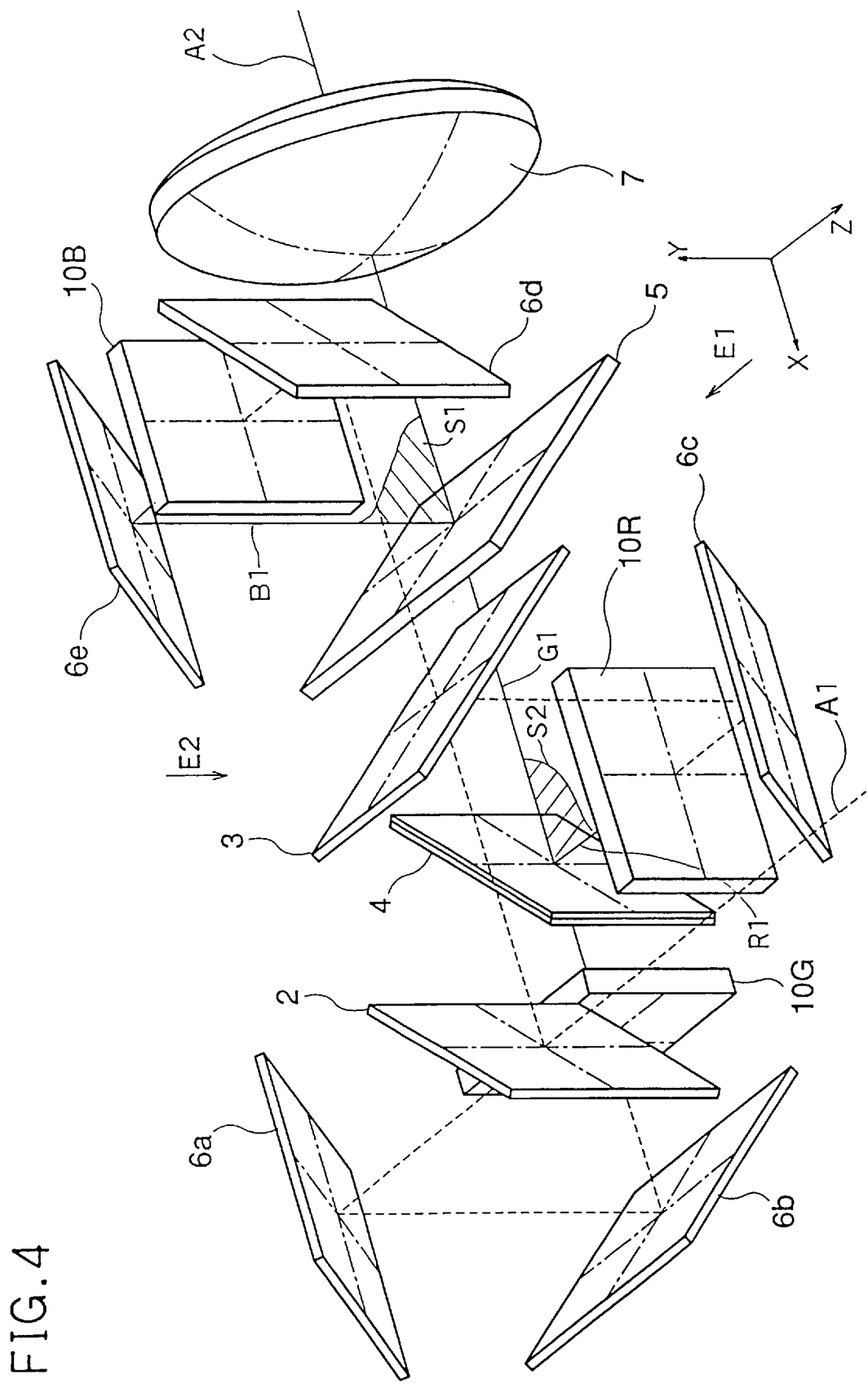
FIG. 4 is a bird's eye view showing a projection optical system according to a first embodiment of the present invention.

A first embodiment of a projection optical system of the present invention will be described with reference to the drawings. FIG. 4 is a bird's eye view of a projection optical system according to this embodiment. The same members as those of the conventional examples are denoted by the same reference numerals. In FIG. 4, white light emitted from a light source (not shown) takes an illumination system path A1 (shown by the broken line in the figure), and is transmitted by a dichroic mirror 2 transmitting the green light and reflecting light beams of other wavelength ranges, is reflected at reflecting mirrors 6a and 6b and is applied to the display panel 10G comprising a liquid crystal panel for displaying the green light.

The light reflected at the dichroic mirror 2 is reflected at a dichroic mirror 3 reflecting the red light and transmitting light beams of other wavelength and at a reflecting mirror 6c and is applied to the display panel 10R for displaying the red light. The blue light transmitted by the dichroic mirror 3 is reflected at a reflecting mirror 6d and is applied to the display panel 10B for displaying the blue light. The red light, the green light and the blue light are applied to the display panels 10R, 10B and 10G by the illumination system thus structured.

Subsequently, a projection system will be described in which the red light, the green light and the blue light applied by the illumination system are transmitted by the display panels 10R, 10B and 10G so that images of red, green and blue exit therefrom. The green light exiting from the display panel 10G takes a projection path A2, and is transmitted by the dichroic mirror 4 reflecting the red light and transmitting light beams of other wavelength ranges and is combined with the red light exiting from the display panel 10R and reflected at the dichroic mirror 4.

The red light and the green light being combined are transmitted by the dichroic mirror 5 reflecting the blue light and transmitting light beams of other wavelength ranges, and are combined with the blue light exiting from the display panel 10B and reflected at the dichroic mirror 5 through a reflecting mirror 6e. The image of the red light, the green light and the blue light being combined is projected so as to be enlarged onto a screen (not shown) by the projection optical system 7 formed of a non-telecentric optical system.

Figure 5:
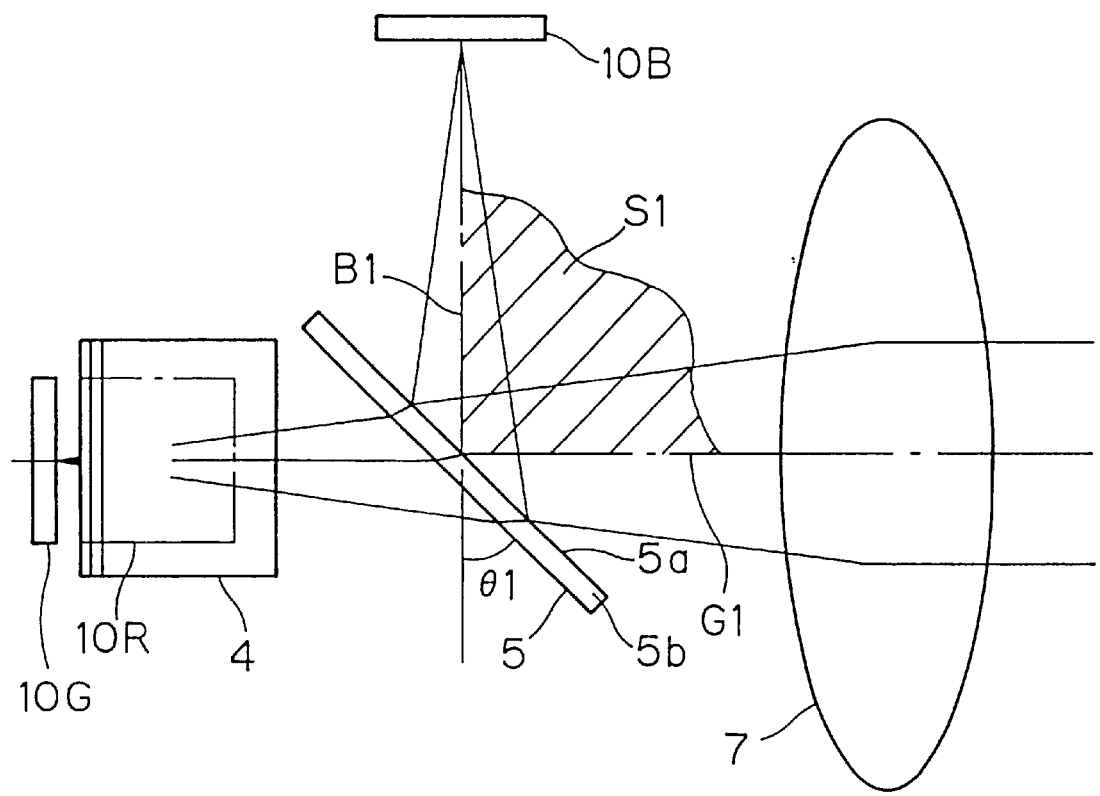
FIG. 5 is a side view showing the projection optical system according to the first embodiment of the present invention.
Figure 6:
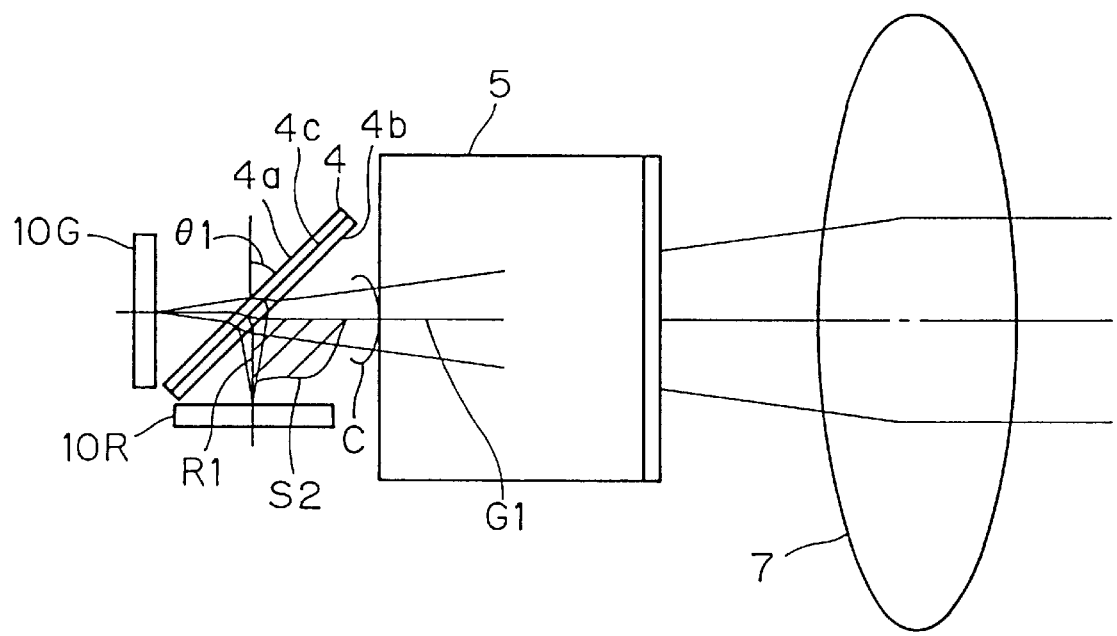
FIG. 6 is a top view showing the projection optical system according to the first embodiment of the present invention.

Shown in FIGS. 5 and 6 are schematic views of this projection system viewed in the directions of the arrows E1 and E2, the dichroic mirrors 4 and 5 are disposed at the same inclination angle θ1 in a so-called twisted position such that a plane S1 including the incidence optical path B1 and the reflection optical path (transmission optical path of the green light) G1 of the blue light reflected at a reflecting surface 5a of the dichroic mirror 5 is orthogonal to a plane S2 including the incidence optical path R1 and the reflection optical path (transmission optical path of the green light) G1 of the red light reflected at the dichroic mirror 4 to thereby cancel the astigmatic difference in the green light transmitted by the dichroic mirrors 4 and 5.

The dichroic mirror 4 comprises two glass substrates 4a and 4b cemented to each other, and a reflecting layer 4c is formed at the joint surface. The thickness of the glass substrates 4a and 4b is half the thickness of a glass substrate 5b constituting the dichroic mirror 5. Since the red light reflected at such a dichroic mirror 4 is transmitted by the glass substrate 4b twice at the same inclination angle, astigmatic difference is caused which is substantially equal to that caused when light is transmitted by the dichroic mirror 4.

By causing equal astigmatic differences in two orthogonal directions by the red light being transmitted by the dichroic mirror 5 to thereby cancel the astigmatic differences out, and by adjusting the optical path length, an image can be projected which is focused on the same plane as the plane on which the blue light is focused and where there is no astigmatic difference.

When the inclination angle θ1 of the dichroic mirrors 4 and 5 is smaller than 45 degrees, for example, it is necessary to dispose the dichroic mirrors 4 and 5 away from each other since it is necessary to dispose the display panel 10R so as not to interfere with the dichroic mirror 5 and the light reflected from the dichroic mirror 4, so that the optical path length increases.

When the inclination angle θ1 is larger than 45 degrees, for example, in FIG. 6, it is necessary to shift the position of the display panel 10G toward the left in the figure so as not to interfere with the dichroic mirror 4, so that the optical path length increases. Therefore, in order that the optical path length can be reduced the most to thereby reduce the lens back focal length LB to reduce the projection optical system in size, it is desirable for the inclination angle of the dichroic mirrors 4 and 5 to be approximately 45 degrees.

The astigmatic difference can be eliminated in the above-described manner. Generally, in a projection optical system in which light obliquely passes through a glass substrate like in the conventional examples and this embodiment, a telecentric optical system is employed in order to eliminate image deteriorations other than the astigmatic difference. However, when the two dichroic mirrors 4 and 5 are disposed between the display panel 10G and the projection lens system 7, the lens back focal length increases, and when an optical system with a long lens back focal length is formed of a telecentric optical system, the lens diameter increases dramatically, which leads to an increase in the cost of the projection lens system. In this embodiment, the projection lens system 7 is formed of a non-telecentric system to thereby reduce the diameter of the projection lens system 7.

Figure 8:
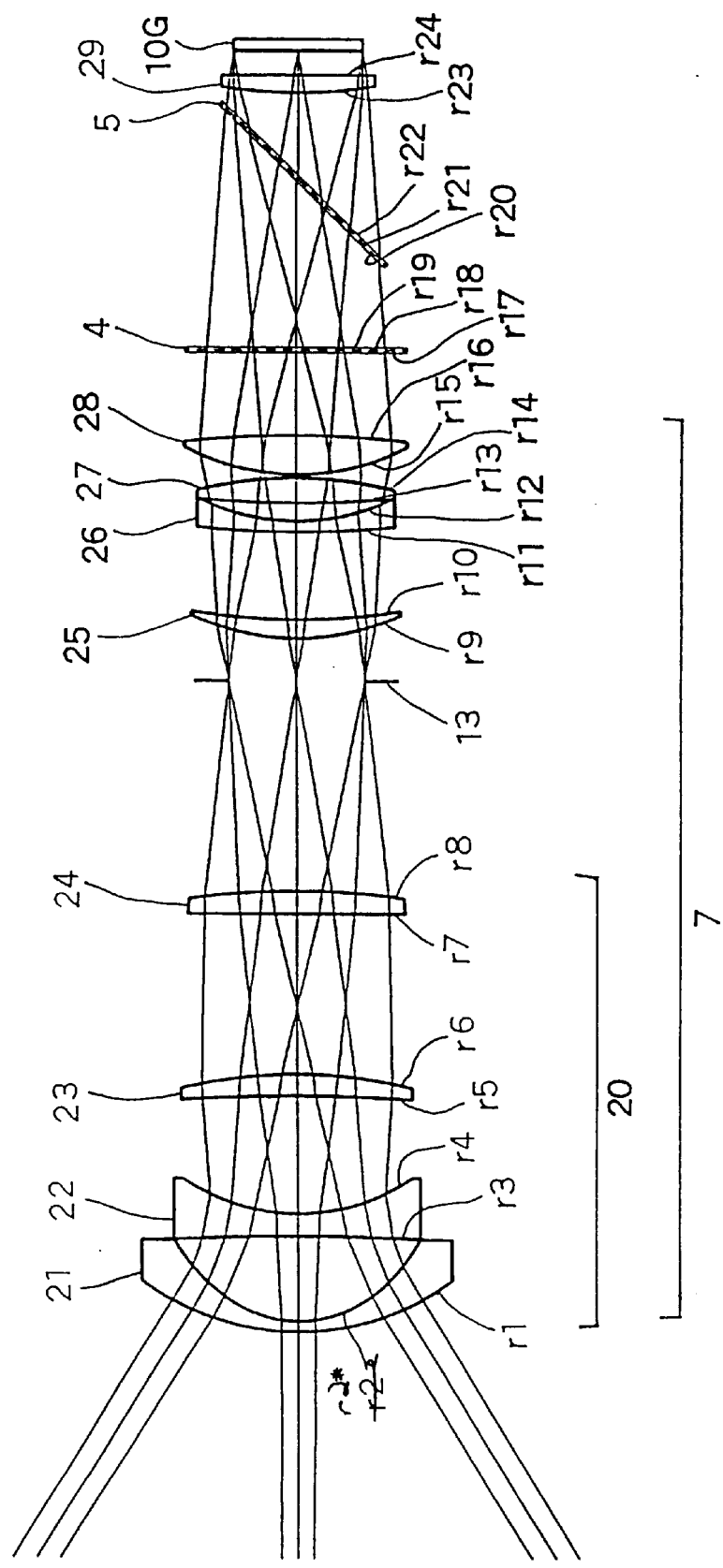
FIG. 8 is a view showing details of the lens arrangement of the first and the second embodiments of the present invention.

FIG. 8 shows details of the lens arrangement for the green light. The light exiting from the display panel 10G passes through a condenser lens 29 and the dichroic mirrors 4 and 5 and is projected onto the screen (not shown) by the projection lens system 7. Since a transmissive liquid crystal panel is used as the display panel 10G, the condenser lens 29 is disposed so that axial and off-axial incident light beams are incident thereon at the same incidence angle. The condenser lens 29 is unnecessary when the characteristics of the display panel 10G are not affected by the incidence angle. Therefore, in this embodiment, the non-telecentric optical system refers to the arrangement on the screen side of the condenser lens 29.

Figure 9:
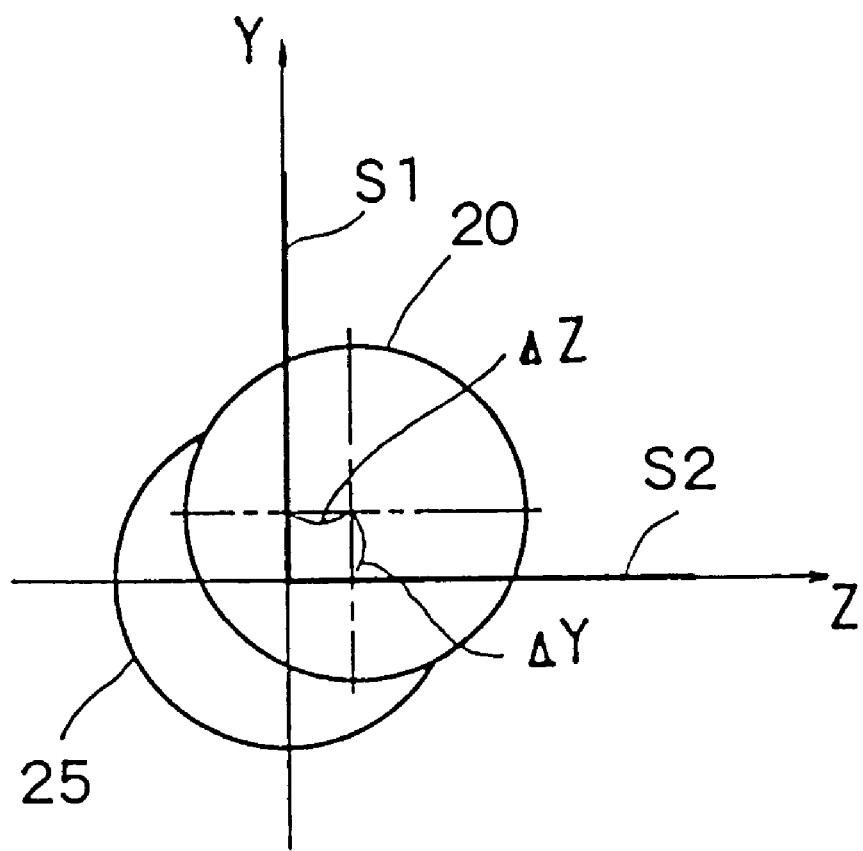
FIG. 9 is a view of assistance in explaining the lens arrangement of the first and the second embodiments of the present invention.

The projection lens system 7 comprises four lens elements (21 to 24) and four lens elements (25 to 28) on the screen side and on the display panel 10G side of an aperture stop 13. As shown in FIG. 9, the optical axis of a decentered lens system 20 on the screen side is decentered by ΔY and ΔZ in the Y and Z directions, respectively, into the region where the planes S1 and S2 form a right angle (see FIG. 4). The symbol ri (i=1,2,3, . . . ) represents the radius of curvature of the i-th surface counted from the screen side.

The arrangement and construction data for the green light of the projection optical system of this embodiment are shown below. In the above-described FIG. 4, the direction of the optical axis of the projection lens system is the X direction, the direction of incidence of the light reflected from the dichroic mirror 5 (the blue light in FIG. 4) is the Y direction and the direction of incidence of the light reflected from the dichroic mirror 4 (the red light in FIG. 4) is the Z direction, and the directions in which the arrows point are positive directions.

In the construction data, ri, di, Ni and vi (i=1,2,3, . . . ) represent the radius of curvature (unit: mm) and the axial distance (unit: mm) of the i-th surface counted from the enlargement side (i.e. the screen side), and the refractive index and the dispersion to the d-line of the i-th optical element counted from the enlargement side, respectively. dS, d8a and d8b represent the distance between the screen and the first surface of the projection optical system, the distance between the eighth surface and the diaphragm and the distance between the diaphragm and the ninth surface, respectively.

The surface marked with an asterisk (r2*) is aspherical, and is defined by the expression shown below representing the surface configuration of an aspherical surface. Aspherical data are shown together with other data.

$$X = (C \cdot Y^2)/\{1 + (1 - \epsilon \cdot C^2 \cdot Y^2)^{1/2}\} + \Sigma(Ai \cdot Y^i)$$

where X is the displacement amount from a reference surface in the direction of the optical axis, Y is the height in a direction vertical to the optical axis, C is the paraxial curvature, ε is the conic constant, and Ai is the i-th aspherical coefficient.

[Arrangement]

FNo.=3

Image heights of the display panels 10R, 10G and 10B:

in the direction of the short side: ±11 mm in the direction of the long side: ±17 mm Decentering amount of the decentered lens system 20:

ΔY: +0.3 mm

ΔZ: +0.3 mm

Inclination of the dichroic mirror 5:

within the XY plane: 45 degrees within the XZ plane: 0 degree

Inclination of the dichroic mirror 4:

within the XY plane: 0 degree within the XZ plane: 45 degrees

[Construction Data (Green Light)]

| Radius of curvature | Axial distance | Refractive index Nd | Dispersion vd |
|---|---|---|---|
| Screen | | | |
| | dS = 845.00 | | |
| r1 = 65.5166 | | | |
| | d1 = 3.00 | N1 = 1.49140 | v1 = 57.82 |
| r2* = 29.1061 | | | |
| | d2 = 22.29 | | |
| r3 = −641.5027 | | | |
| | d3 = 6.00 | N2 = 1.75450 | v2 = 51.57 |
| r4 = 51.8861 | | | |
| | d4 = 31.39 | | |
| r5 = −474.1629 | | | |
| | d5 = 5.76 | N3 = 1.53610 | v3 = 45.97 |
| r6 = −121.4176 | | | |
| | d6 = 43.04 | | |
| r7 = −13330.6672 | | | |
| | d7 = 6.14 | N4 = 1.73139 | v4 = 24.36 |
| r8 = −194.0576 | | | |
| | d8a = 56.06 | | |
| Diaphragm | | | |
| | d8b = 11.12 | | |
| r9 = 61.2715 | | | |
| | d9 = 5.26 | N5 = 1.55405 | v5 = 41.76 |
| r10 = 170.6188 | | | |
| | d10 = 23.21 | | |
| r11 = 239.4011 | | | |
| | d11 = 3.00 | N6 = 1.83382 | v5 = 21.05 |
| r12 = 57.2459 | | | |
| | d12 = 4.84 | | |
| r13 = 268.5140 | | | |
| | d13 = 6.67 | N7 = 1.50606 | v6 = 67.85 |
| r14 = −109.1329 | | | |
| | d14 = 1.00 | | |
| r15 = 61.1845 | | | |
| | d15 = 10.23 | N8 = 1.48750 | v8 = 70.44 |
| r16 = −255.0825 | | | |
| | d16 = 22.00 | | |
| r17 = ∞ | | | |
| | d17 = 0.75 | N9 = 1.51680 | v9 = 64.20 |
| r18 = ∞ | (Dichroic-coated surface) | | |
| | d18 = 0.75 | N10 = 1.51680 | v10 = 64.20 |
| r19 = ∞ | | | |
| | d19 = 44.00 | | |
| r20 = ∞ | | | |
| | d20 = 0.75 | N11 = 1.51680 | v11 = 64.20 |
| r21 = ∞ | (Dichroic-coated surface) | | |
| | d21 = 0.75 | N12 = 1.51680 | v12 = 64.20 |
| r22 = ∞ | | | |
| | d22 = 22.00 | | |
| r23 = 116.2791 | | | |
| | d23 = 5.00 | N13 = 1.52680 | v13 = 64.20 |
| r24 = ∞ | | | |
| | d24 = 6.48 | | |

Display panel 10G

[Aspherical Data of 2nd Surface (r2)]

ε=0.008226

A4=2.17909×10$^{-6}$

A6=1.87761×10$^{-9}$

A8=−1.84795×10$^{-12}$

A10=2.26966×10$^{-15}$

A12=−8.31352×10$^{-19}$

For the red light and the blue light, in order to correct chromatic aberration of magnification, the position of the condenser lens 29 is parallelly shifted by 0.2 mm toward the screen side for the green light. For this reason, the optically developed construction data of the part, from the 22nd surface to the display panels 10R and 10B, of the projection optical system of this embodiment are as shown below.

[Construction Data (Red Light, Blue Light)]

| Radius of curvature | Axial distance | Refractive index Nd | Dispersion vd |
|---|---|---|---|
| r22 = ∞ | | | |
| | d22 = 21.80 | | |
| r23 = 116.2791 | | | |
| | d23 = 5.00 | N13 = 1.52680 | v13 = 64.20 |
| r24 = ∞ | | | |
| | d24 = 6.68 | | |

Display Panels 10R, 10B

Figure 10A:
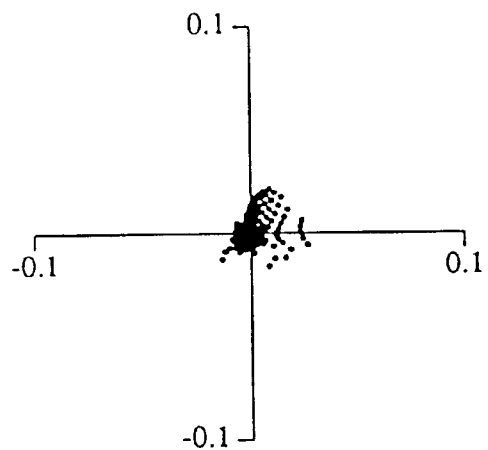
FIGS. 10A to 10C are point image distribution views of assistance in explaining effects of the first embodiment of the present invention.
Figure 10B:
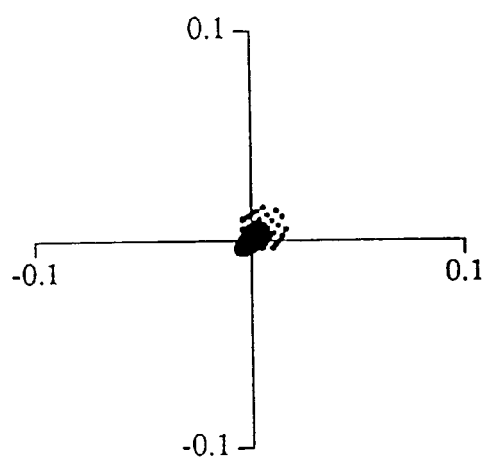
Figure 10C:
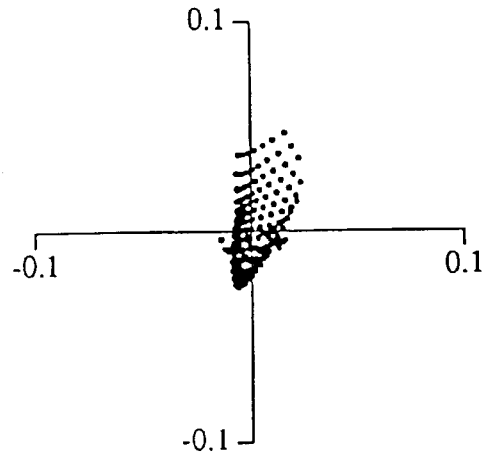
Figure 11A:
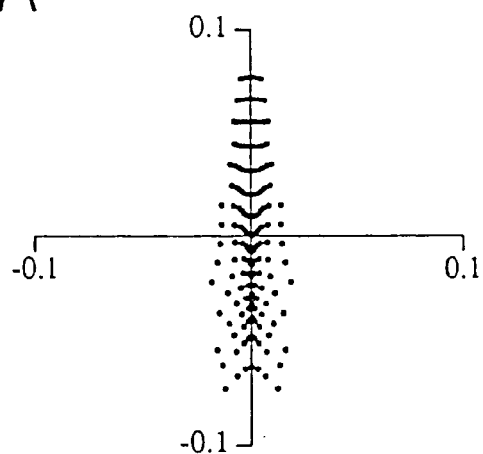
FIGS. 11A to 11C are point image distribution views of assistance in explaining the effects of the first embodiment of the present invention.
Figure 11B:
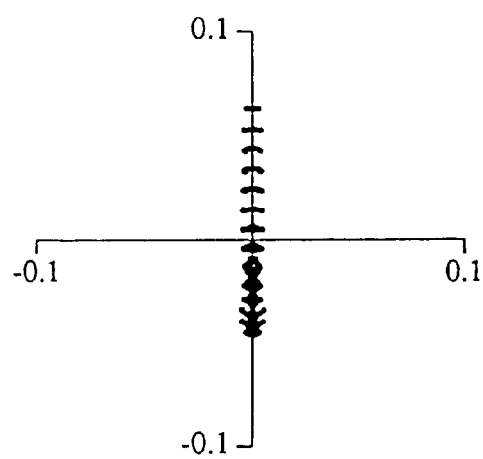
Figure 11C:
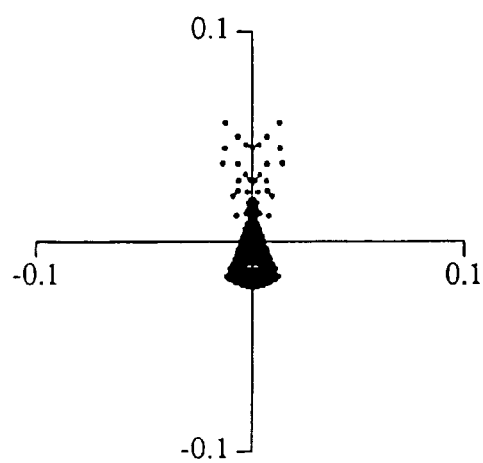

In FIGS. 10A to 10C are point image distribution views of a case in which the inclination angle of the dichroic mirrors 4 and 5 in FIG. 4 is 45 degrees when the decentered lens system 20 of the above-described non telecentric optical system is not decentered. For comparison, point image distribution views of a case in which the light is transmitted by one glass plate with an inclination angle of 45 degrees are shown in FIGS. 11A to 11C. Although light inherently proceeds from the display panel toward the screen, for ease of evaluation, light is expressed as being imaged from the screen side to the display panel side at the time of evaluation of imaging condition of the projection optical system. Therefore, the following point image distribution views show evaluation results on the side of the display panel 10G.

Figure 12A:
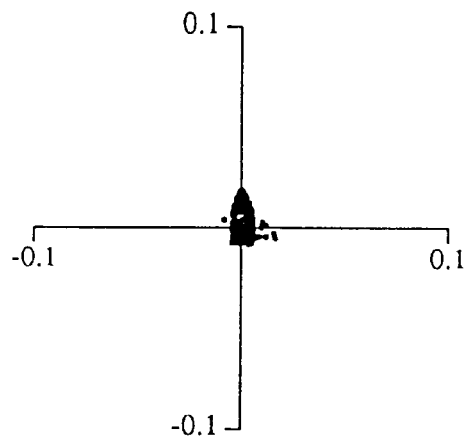
FIGS. 12A to 12C are point image distribution views of the first embodiment of the present invention.
Figure 12B:
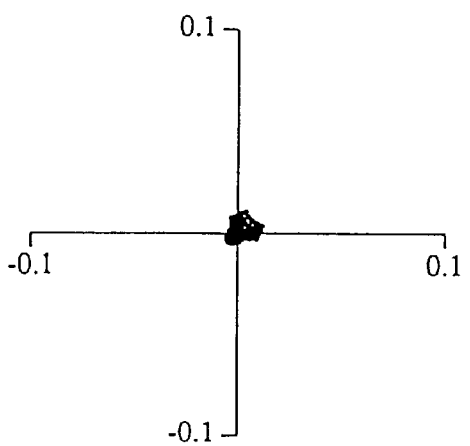
Figure 12C:
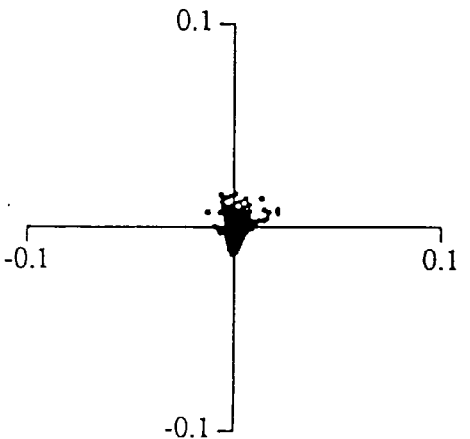

In FIGS. 10A to 10C, FIGS. 11A to 11C and subsequently described FIGS. 12A to 12C, the lateral axis and the longitudinal axis represent displacement in the direction of the short side and displacement in the direction of the long side, respectively. FIGS. 10A, 11A and 12A, FIGS. 10B, 11B and 12B and FIGS. 10C, 11C and 12C show point image distributions at a position 15 mm away from the center of the display panel in the negative direction of the direction of the long side, at the center of the display panel, and at a position 15 mm away from the center of the display panel in the positive direction of the direction of the long side, respectively.

According to these figures, although the point image distributions are elongated in one direction in the case in which the light is transmitted by one inclined glass plate as shown in FIGS. 11A to 11C, in FIGS. 10A to 10C, the point image distributions are substantially concentrated in the center by the dichroic mirrors 4 and 5 and the elimination of the astigmatic difference produces an effect. However, axial coma aberration as shown in FIG. 10B and one-sided aberration as shown in FIG. 10C remain. One-sided aberration, which is generated when a non-telecentric optical system is used, can be reduced by decentering the decentered lens system 20 as shown in FIG. 9.

FIGS. 12A to 12C show point image distributions of a case in which the decentering amounts AY and AZ of the decentered lens system 20 are each 0.3 mm. According to the figures, one-sided aberration is reduced and the point images are substantially concentrated in the center. In this embodiment, the inclination α, at the most off-axial part, of the principal ray passing through the dichroic mirrors 4 and 5 is 6 degrees. When the inclination α is smaller than 3 degrees, the projection lens system increases in size like the case of the telecentric system. When the inclination α is larger than 12 degrees, the one-sided aberration reducing effect by the decentering of the decentered lens system 20 decreases. Therefore, it is preferable for the inclination α to be within a range of 3 to 12 degrees.

Thus, by using a non-telecentric optical system, the projection optical system can be reduced in size. One-sided aberration caused by the use of the non-telecentric optical system can be reduced by decentering some of the lens elements and chromatic aberration of magnification can be reduced by shifting the position of the condenser lens 29 on the optical paths of the red light and the blue light with respect to the position on the optical path of the green light, so that excellent images can be obtained in which no color displacements are caused when the colors are combined. Further, axial chromatic aberration can be reduced by slightly shifting in the direction of the optical axis the positions of the display panels 10R and 10B for the red light and the blue light with respect to the position of the display panel 10G for the green light.

In this embodiment, for the red light and the green light, one-sided aberration is reduced by decentering the decentered lens system 20. However, for the blue light, one-sided aberration is caused by the decentered lens system 20 since the blue light is not transmitted by the dichroic mirrors 4 and 5. The blue light is low in visual sensitivity compared to the red light and the green light, and the image quality can therefore be lower for the blue light than for the red light and the green light. However, some correction can be made by inclining the display panel 10B with respect to the optical axis. Optically, the display panel 10B is inclined approximately 0.4 degrees on the cross section where the decentered lens system 20 is decentered.

Subsequently, a second embodiment will be described with reference to the arrangement view of FIG. 7, where such components as are found also in FIG. 4 are identified with the same reference symbols. In the figure, the light transmitted by the dichroic mirror 4 is the red light, and the light reflected at the dichroic mirror 4 is the green light. In each of the dichroic mirror 5 and the reflecting mirror 6e, a reflecting surface is formed on the joint surface of substrates with a half thickness like in the dichroic mirror 4. Except for these, the arrangement is the same as that of the first embodiment.

In the first embodiment (see FIG. 4), as described above, in the blue light exiting from the display panel 10B, one-sided aberration is caused by the decentered lens system 20 since the blue light is not transmitted by the dichroic mirrors 4 and 5. Therefore, in the second embodiment, in each of the dichroic mirror 5 and the reflecting mirror 6e, a reflecting surface is formed on the joint surface of the two substrates with a half thickness like in the dichroic mirror 4 to thereby cause one-sided aberration like those caused in the red light and the green light and the one-sided aberration is reduced by the decentered lens system 20. The same effect can be obtained when the reflecting mirror 6e is formed so that light is reflected at the reverse surface of one substrate with a thickness half that of the dichroic mirror 4.

Figure 13:
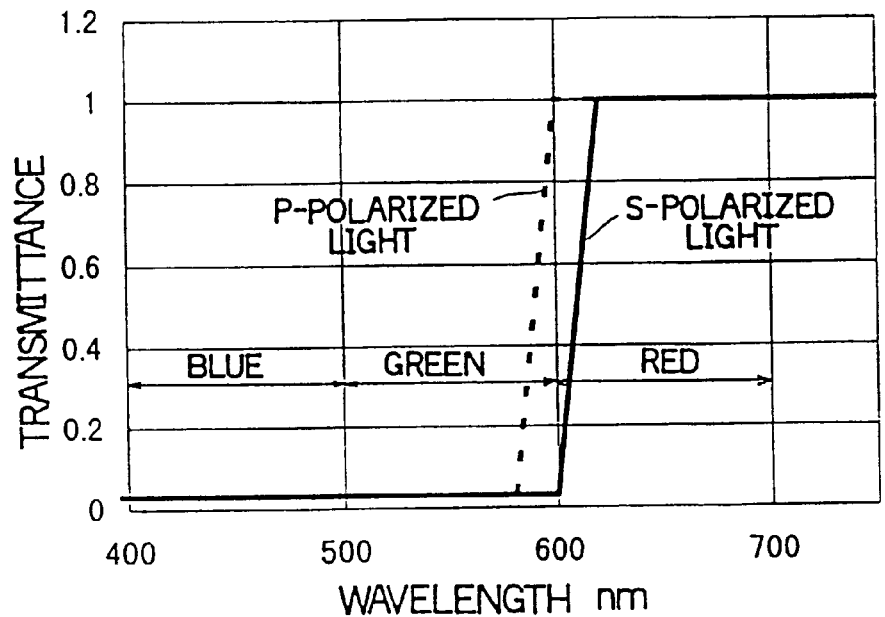
FIG. 13 is a view showing a characteristic of dichroic mirrors in the second embodiment of the present invention.

In a non-telecentric optical system, the light incidence angle differs between the axial part and the off-axial part in the dichroic mirrors 4 and 5 (see FIG. 8). The dichroic mirrors 4 and 5 have a characteristic, for example, as shown in FIG. 13. Since the cutoff wavelength at which switching between transmittance and reflection is made according to the wavelength of the light varies according to the incidence angle, the wavelengths of transmitted light and reflected light differ between the axial part and the off-axial part, so that the color differs between the central part and the peripheral part of the screen.

Figure 7:
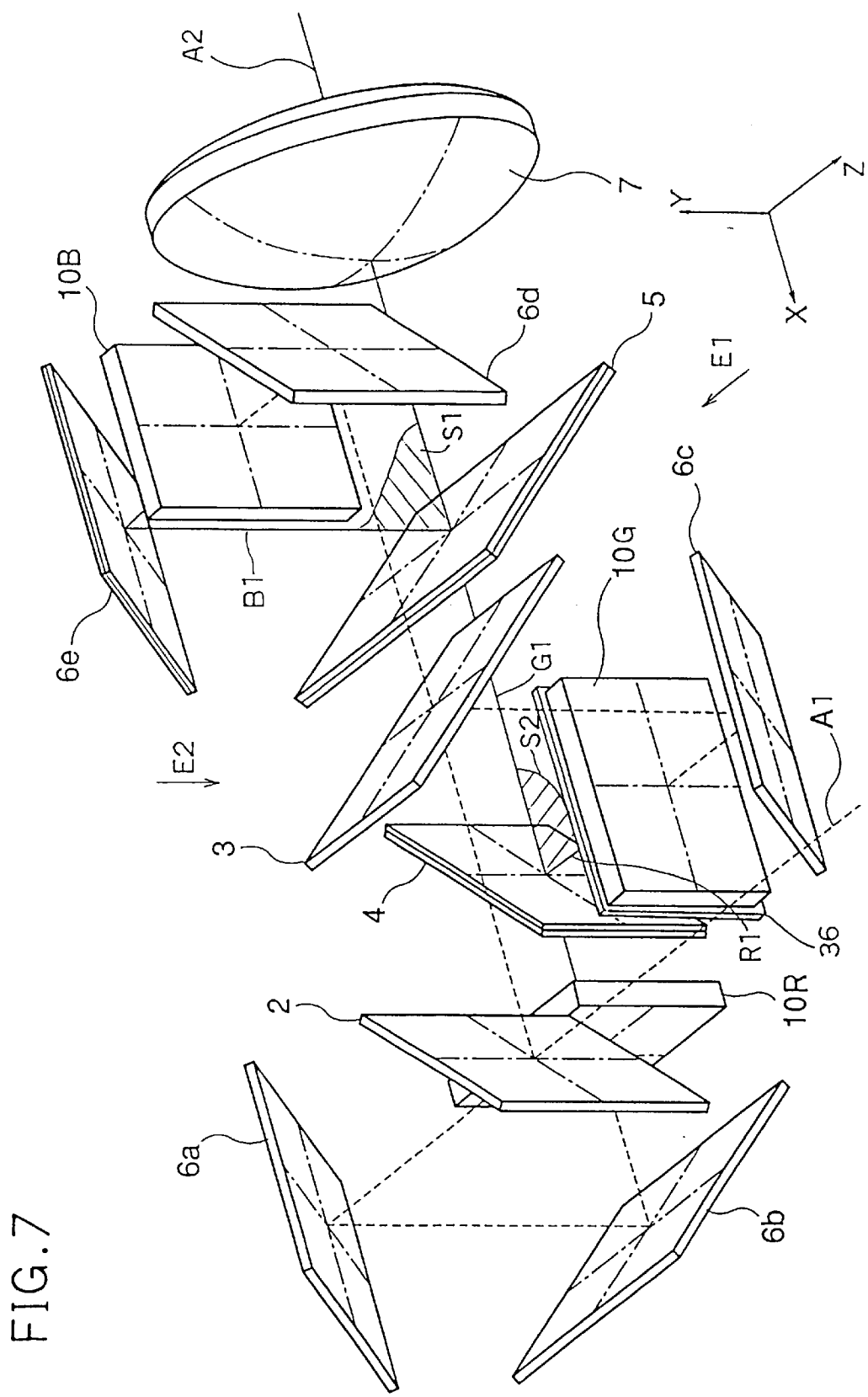
FIG. 7 is a bird's eye view showing a projection optical system according to a second embodiment of the present invention.

In the previously-described FIG. 7, the dichroic mirror 4 and the dichroic mirror 2 of the illumination system transmit the red light and reflect the green light. With this arrangement, the variation in cutoff wavelength according to the incidence angle is smaller than in the arrangement where the dichroic mirrors 4 and 2 transmit the green light and reflect the red light. Moreover, an inclining mirror where the cutoff wavelength differs according to the position within the plane of the dichroic mirror may be used so as to cancel out the variation in cutoff wavelength according to the incident angle.

In order that a slight variation in incidence angle exerts no influence, trimming filters or the like may be disposed at the front of the light incidence positions of the display panels 10R, 10G and 10B to thereby remove the light of wavelengths, for example, in the vicinity of the border between the green light and the red light.

In this embodiment, liquid crystal display devices are used as the display panels 10R, 10G and 10B. In a case where devices using polarized luminous fluxes such as liquid crystal display devices are used, means as described below may be used in order that the difference in incidence angle between the axial part and the off-axial part of the dichroic mirror exerts no influence.

In FIG. 7, non-illustrated light source, reflector and integrator for eliminating nonuniformness of the light source are disposed on the illumination path A1, and a polarization converting optical system is provided for converting light incident on the display panels 10R, 10G and 10B using liquid crystal display devices into light having a predetermined plane of polarization. In this embodiment, when the light to be incident on the dichroic mirror 2 is light having a plane of polarization in the Y direction, that is, s-polarized light, the light to be incident on the reflecting mirror 6a is p-polarized light and the light to be incident on the reflecting mirror 6b is s-polarized light, and the light to be incident on the display panel 10R has a plane of polarization in the direction of the long side of the display panel 10R (Z direction).

The light reflected at the dichroic mirror 2 is incident on the dichroic mirror 3 as p-polarized light, and the light incident on the reflecting mirror 6c becomes s-polarized light and the light incident on the display panel 10G has a plane of polarization in the direction of the long side of the display panel 10G (X direction). The light transmitted by the dichroic mirror 3 is incident on the reflecting mirror 6d as s-polarized light and the light incident on the display panel 10B has a plane of polarization in the direction of the long side of the display panel 10B (Y direction).

Figure 14:
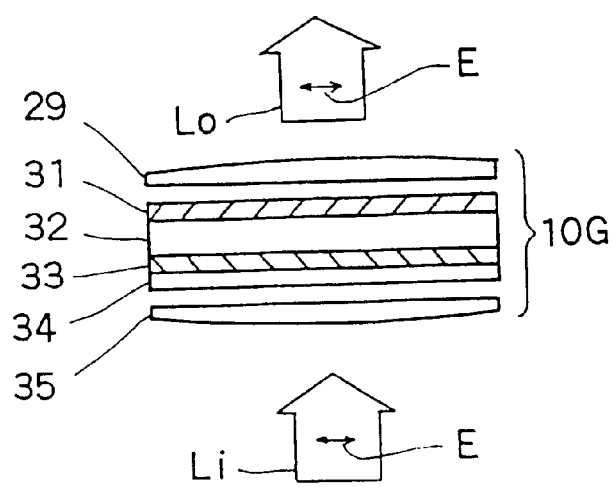
FIG. 14 is a view showing the structure of display panels in the second embodiment of the present invention.

As shown in FIG. 14, when the display panels 10R, 10G and 10B each comprise the following elements superposed one on another: a long side direction polarizing plate 31, a liquid crystal display device 32, a short side direction polarizing plate 33, a half wave plate 34 and an illumination condenser lens 35, illumination light Li incident on the display panels 10R, 10G and 10B with a plane of polarization in the direction of the long side is converted into light having a plane of polarization in the direction of the short side by the half wave plate 34. Then, after the disturbance of the plane of polarization is corrected by the short side direction polarizing plate 33, the light is made incident on the liquid crystal display device 32.

When the light is incident thereon, the liquid crystal display device 32 rotates the plane of polarization 90 degrees when the signal is on at each pixel and outputs the light without rotating the plane of polarization when the signal is off. Consequently, for the light having a plane of polarization in the direction of the short side, only the information of the pixels where the signal is on is converted into light having a plane of polarization in the direction of the long side and passes through the long side direction polarizing plate 31, so that projection light L0 exits from the display panels 10R, 10G and 10B. In the figure, the arrow E represents the direction of the plane of polarization.

In the green light, the light exiting from the display panel 10G is output after further converted into light having a plane of polarization in the direction of the short side by a half wave plate 36 (see FIG. 7). In FIGS. 7 and 14, the condenser lens 29 shown in FIG. 8 is placed in the display panels 10R, 10G and 10B.

With this arrangement, the red light incident on the dichroic mirror 4 is p-polarized light and the green light is s-polarized light. The characteristic of the dichroic mirror 4 is as shown in FIG. 13. Typically, the cutoff wavelength shifts toward the long wavelength side more in s-polarized light than in p-polarized light.

For example, when the cutoff wavelength of the dichroic mirror 2 that separates the red light and the green light in the illumination optical system is 600 nm, illumination light of a wavelength of 600 nm or more and illumination light of a wavelength of 600 nm or less are applied to the display panel 10R for the red light and the display panel 10G, respectively. Even when the angle of incidence on the dichroic mirror 4 having a characteristic as shown in FIG. 13 differs between the axial part and the off-axial part and the cutoff wavelength slightly varies according to the incidence angle, p-polarized light with a wavelength of 600 nm or more is surely transmitted by the dichroic mirror 4 and s-polarized light with a wavelength of 600 nm or less is surely reflected at the dichroic mirror 4. Consequently, the color difference between the central portion and the peripheral portion of the screen can be reduced.

In the dichroic mirror 5, since the transmitted light is the p-polarized green light and the reflected light is the s-polarized blue light, a similar effect can be obtained by the dichroic mirror 5 having a characteristic such that the cutoff wavelength exists at the border between blue and green. Although the red light is transmitted by the dichroic mirror 5 as s-polarized light, no problem is caused since its wavelength is away from the cutoff wavelength.

As described above, by arranging the non-telecentric optical system using polarized luminous fluxes so that p-polarized light is transmitted and s-polarized light is reflected for light beams of adjacent colors transmitted by and reflected at the dichroic mirrors 4 and 5, it is possible to prevent the variation in incident angle from exerting an influence by the difference in cutoff wavelength between p-polarized light and s-polarized light even when the incidence angle of the light incident on the dichroic mirror differs between the axial part and the off-axial part. Consequently, the color difference between the central part and the peripheral part of the screen can be reduced.

Obviously, many modifications and variations of the present invention are possible in light of the above teachings. It is therefore to be understood that within the scope of the appended claims, the invention may be practiced other than as specifically described.

What is claimed is:

1. A projection optical apparatus comprising:
    a projection lens system, wherein some lens elements included in the lens system are disposed so as to be decentered with respect to an optical axis of the entire projection lens system; and
    a dichroic mirror of which reflecting surface is disposed so as to incline with respect to the optical axis of the projection lens system, said dichroic mirror comprising two transparent substrates and the reflecting surface being formed between the two transparent substrates.

2. A projection optical apparatus as claimed in claim 1, wherein said projection lens system is a non-telecentric optical system.

3. A projection optical apparatus as claimed in claim 1, wherein said reflecting surface of the dichroic mirror is disposed so as to incline 45 degrees with respect to the optical axis of the projection lens system.

4. A projection optical apparatus comprising:

a projection lens system;

a first dichroic mirror of which reflecting a surface is disposed so as to incline with respect to an optical axis of the projection lens system, said first dichroic mirror comprising two transparent substrates and the reflecting surface formed between the two transparent substrates; and a second dichroic mirror of which reflecting a surface is disposed so as to incline with respect to the optical axis of the projection lens system, wherein a luminous flux of a first wavelength range is rectilinearly transmitted by the first and second dichroic mirrors, a luminous flux of a second wavelength range is reflected at the first dichroic mirror and is rectilinearly transmitted by the second dichroic mirror, and a luminous flux of a third wavelength range different from the first and second wavelength ranges is reflected at the second dichroic mirror, thereby directing all of the luminous fluxes of the first to third wavelength ranges to an image plane, and wherein a plane including optical paths of incidence and reflection of the luminous flux of the second wavelength range on and from the first dichroic mirror and a plane including optical paths of incidence and reflection of the luminous flux of the third wavelength range on and from the second dichroic mirror are orthogonal to each other.

5. A projection optical apparatus as claimed in claim 4, wherein said second dichroic mirror comprises two transparent substrates and the reflecting surface being formed between the two transparent substrates.

6. A projection optical apparatus as claimed in claim 4, wherein said first and second dichroic mirrors are disposed so as to incline 45 degrees with respect to the optical axis of the projection lens system.

7. A projection optical apparatus as claimed in claim 4, wherein said first and second dichroic mirrors have the same substrate thickness and the same angle of inclination with respect to the luminous flux of the first wavelength range.

8. A projection optical apparatus as claimed in claim 4, wherein the projection lens system is a non-telecentric optical system.

9. A projection optical apparatus as claimed in claim 4, wherein some lens elements included in the projection lens system are disposed so as to be decentered with respect to the optical axis of the entire projection lens system.

10. A projection optical apparatus as claimed in claim 4, wherein said first wavelength range is a wavelength range of green (G).

11. A color projector for projecting an image on a display device illuminated by a light source, comprising:

a projection lens system for projecting the image on the display device, wherein some lens elements included in the lens system are disposed so as to be decentered with respect to an optical axis of the entire projection lens system; and a dichroic mirror of which a reflecting surface is disposed so as to incline with respect to the optical axis of the projection lens system, said dichroic mirror comprising two transparent substrates and the reflecting surface being formed between the two transparent substrates.

12. A color projector for projecting an image on a display device illuminated by a light source, comprising:

a projection lens system;

a first dichroic mirror of which a reflecting surface is disposed so as to incline with respect to an optical axis of the projection lens system, said first dichroic mirror comprising two transparent substrates and the reflecting surface formed between the two transparent substrates; and a second dichroic mirror of which a reflecting surface is disposed so as to incline with respect to the optical axis of the projection lens system, wherein a luminous flux of a first wavelength range is rectilinearly transmitted by the first and second dichroic mirrors, a luminous flux of a second wavelength range is reflected at the first dichroic mirror and is rectilinearly transmitted by the second dichroic mirror, and a luminous flux of a third wavelength range different from the first and second wavelength ranges is reflected at the second dichroic mirror, thereby directing all of the luminous fluxes of the first to third wavelength ranges to an image plane, and wherein a plane including optical paths of incidence and reflection of the luminous flux of the second wavelength range on and from the first dichroic mirror and a plane including optical paths of incidence and reflection of the luminous flux of the third wavelength range on and from the second dichroic mirror are orthogonal to each other.

* * * * *

UNITED STATES PATENT AND TRADEMARK OFFICE
CERTIFICATE OF CORRECTION

Figure 1:
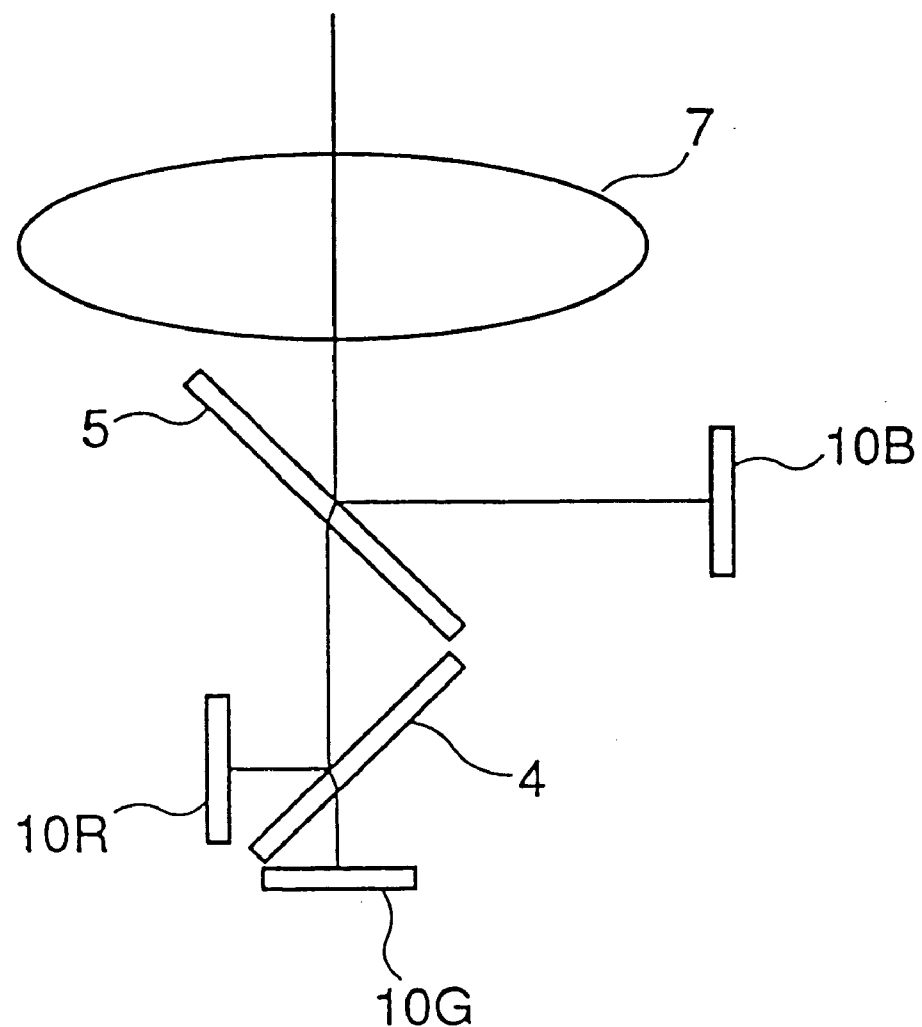
FIG. 1 is a schematic view showing a conventional projection optical system.

PATENT NO. : 6,144,497
DATED : November 7, 2000
INVENTOR(S) : Kohtaro Hayashi and Kenji Konno It is certified that error appears in the above-identified patent and that said Letters Patent is hereby corrected as shown below:

Delete Fig. 1, and insert:

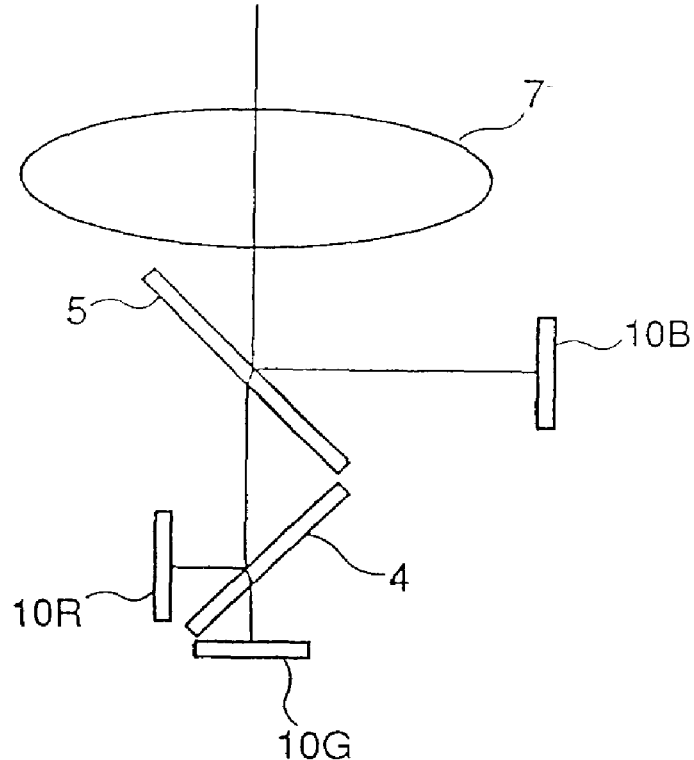

UNITED STATES PATENT AND TRADEMARK OFFICE
CERTIFICATE OF CORRECTION

Figure 2:
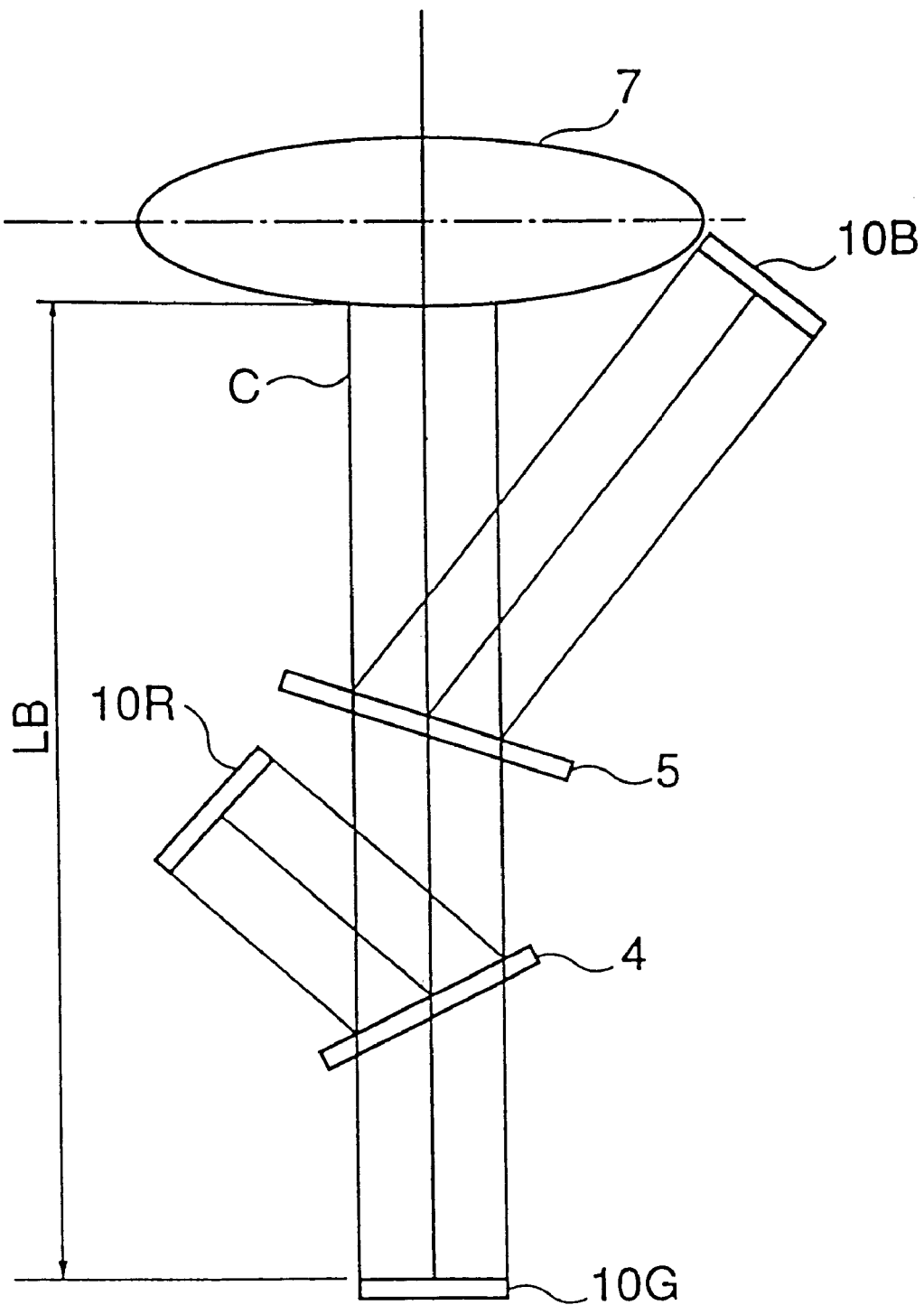
FIG. 2 is a schematic view showing another conventional projection optical system.

PATENT NO. : 6,144,497
DATED : November 7, 2000
INVENTOR(S) : Kohtaro Hayashi and Kenji Konno It is certified that error appears in the above-identified patent and that said Letters Patent is hereby corrected as shown below:

Delete Fig. 2, and insert:

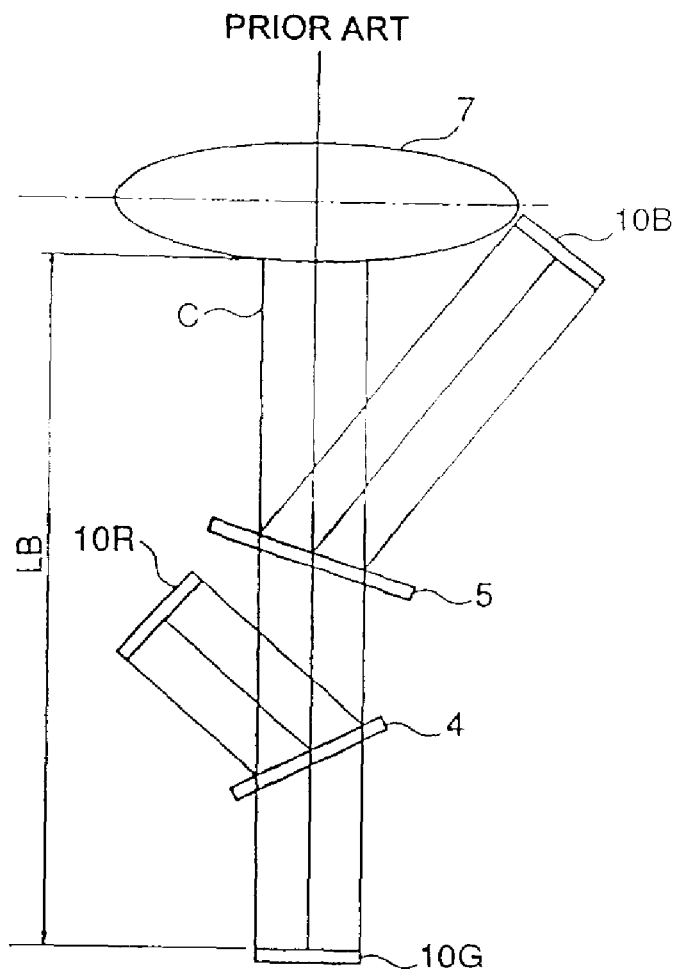

UNITED STATES PATENT AND TRADEMARK OFFICE
CERTIFICATE OF CORRECTION

Figure 3:
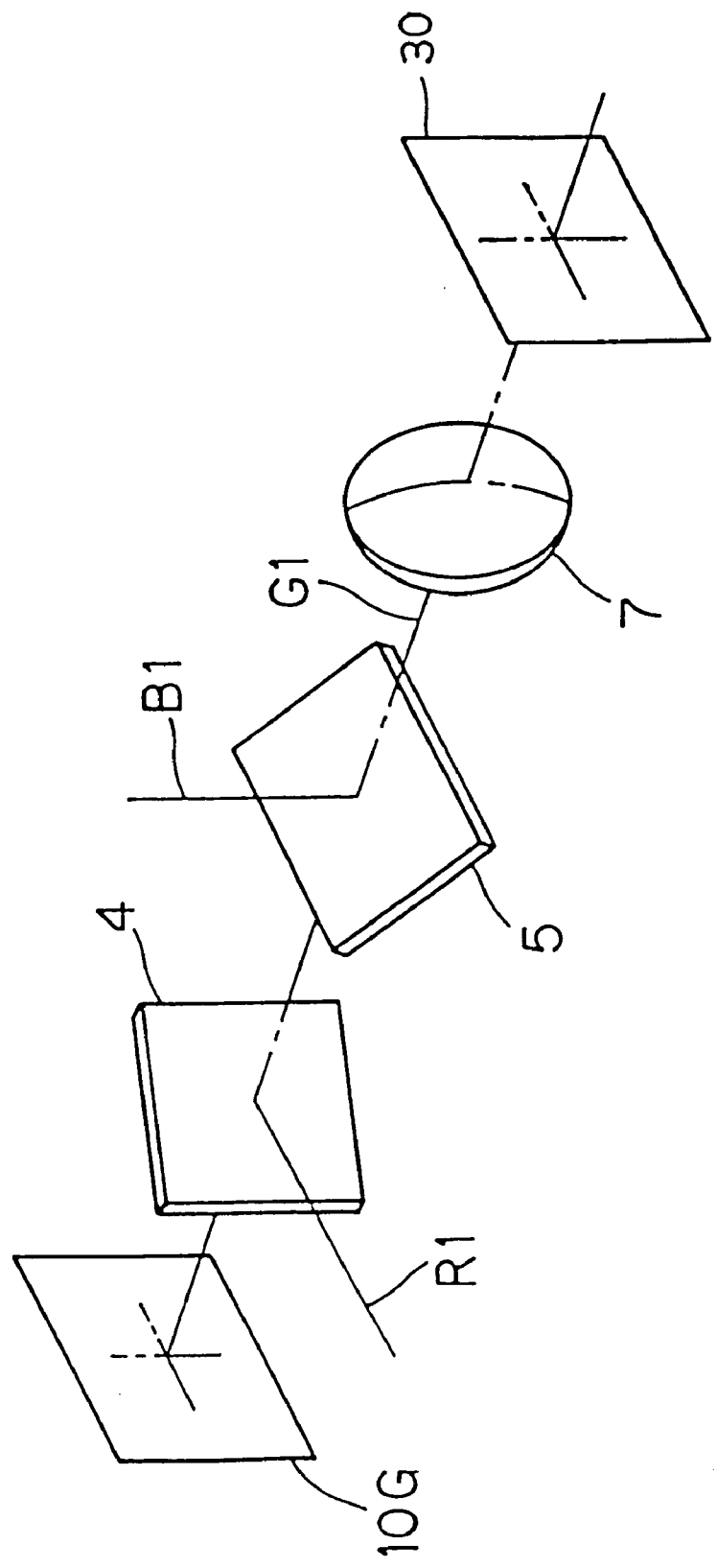
FIG. 3 is a schematic view showing still another conventional projection optical system.

PATENT NO. : 6,144,497
DATED : November 7, 2000
INVENTOR(S) : Kohtaro Hayashi and Kenji Konno It is certified that error appears in the above-identified patent and that said Letters Patent is hereby corrected as shown below:

Delete Fig. 3, and insert:

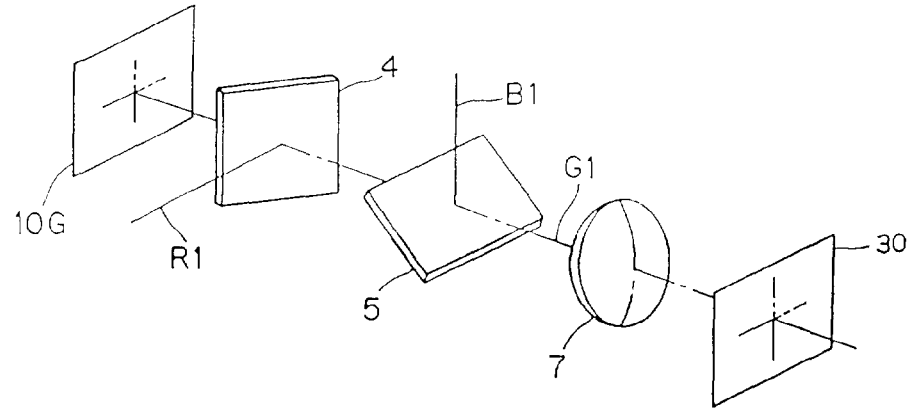

FIG.3          PRIOR ART

UNITED STATES PATENT AND TRADEMARK OFFICE
CERTIFICATE OF CORRECTION

PATENT NO. : 6,144,497
DATED : November 7, 2000
INVENTOR(S) : Kohtaro Hayashi and Kenji Konno It is certified that error appears in the above-identified patent and that said Letters Patent is hereby corrected as shown below:

Delete Fig. 8, and insert:

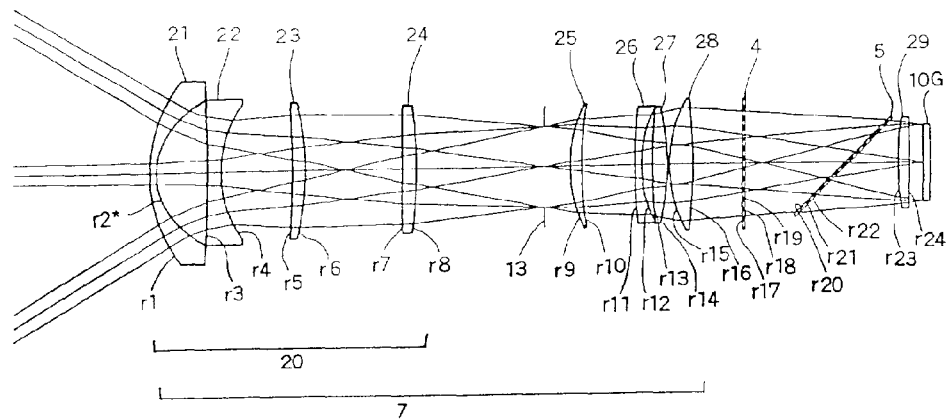

FIG.8

UNITED STATES PATENT AND TRADEMARK OFFICE
CERTIFICATE OF CORRECTION

PATENT NO.    : 6,144,497
DATED         : November 7, 2000
INVENTOR(S)   : Kohtaro Hayashi and Kenji Konno It is certified that error appears in the above-identified patent and that said Letters Patent is hereby corrected as shown below:

Column 10,
Line 63, before "reflecting", insert -- a --.

Column 11,
Line 11, delete "reflecting a", and insert -- a reflecting --.
Line 17, delete "reflecting a", and insert -- a reflecting --.

This certificate supersedes Certificate of Correction issued October 27, 2001.

Signed and Sealed this

Twentieth Day of August, 2002

*Attest:*

JAMES E. ROGAN
*Attesting Officer*  *Director of the United States Patent and Trademark Office*